United States Patent
Rojas

(10) Patent No.: US 9,112,383 B2
(45) Date of Patent: Aug. 18, 2015

(54) SYSTEM AND METHOD FOR VAR INJECTION AT A DISTRIBUTED POWER GENERATION SOURCE

(75) Inventor: Hernan Alex Rojas, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 783 days.

(21) Appl. No.: 13/285,578

(22) Filed: Oct. 31, 2011

(65) Prior Publication Data

US 2013/0107598 A1 May 2, 2013

(51) Int. Cl.
*H02J 3/00* (2006.01)
*H02J 3/18* (2006.01)

(52) U.S. Cl.
CPC ............ *H02J 3/1842* (2013.01); *H02J 3/1814* (2013.01); *Y02E 40/18* (2013.01); *Y02E 40/22* (2013.01)

(58) Field of Classification Search
USPC .......................................................... 307/69
See application file for complete search history.

(56) References Cited

U.S. PATENT DOCUMENTS

| | | | |
|---|---|---|---|
| 2,890,069 A | 6/1959 | Larkin et al. | |
| 2,971,743 A | 2/1961 | Welsh | |
| 3,076,634 A | 2/1963 | Boyle et al. | |
| 3,383,095 A | 5/1968 | Anderson | |
| 3,632,228 A | 1/1972 | Acres | |
| 3,832,092 A | 8/1974 | Manharth | |
| 3,936,234 A | 2/1976 | Tucker et al. | |
| 4,349,318 A | 9/1982 | Libertini et al. | |
| 4,432,555 A | 2/1984 | Langley | |
| 4,470,756 A | 9/1984 | Rigo et al. | |
| 4,470,757 A | 9/1984 | Vollinger | |
| 4,566,857 A | 1/1986 | Brumen | |
| 4,778,342 A | 10/1988 | Conlow | |
| 4,797,065 A | 1/1989 | Conlow | |
| 5,281,098 A | 1/1994 | Glynn et al. | |
| 5,302,086 A | 4/1994 | Kulesa et al. | |
| 5,727,927 A | 3/1998 | Luxenburger | |
| 5,749,706 A | 5/1998 | Maar | |
| 5,984,639 A | 11/1999 | Gekht et al. | |
| 6,488,473 B1 | 12/2002 | Lee et al. | |
| 7,090,468 B2 | 8/2006 | Brueckner | |
| 7,264,448 B2 | 9/2007 | Garner | |
| 2004/0090211 A1* | 5/2004 | Gupta et al. | 322/10 |
| 2010/0208501 A1* | 8/2010 | Matan et al. | 363/95 |
| 2013/0006436 A1* | 1/2013 | Masters et al. | 700/295 |

* cited by examiner

*Primary Examiner* — Rexford Barnie
*Assistant Examiner* — Dru Parries
(74) *Attorney, Agent, or Firm* — Sutherland Asbill & Brennan LLP

(57) ABSTRACT

A method to add locally generated real and reactive power to a power distribution grid including: generating or storing direct current (DC) power by distributed power source; converting the DC power to an alternating current (AC) power; calculating or measuring a power factor of the AC power provided from the distribution grid; determining a power factor for the conversion of DC power to AC power based on the power factor for the AC from the distribution grid, and the conversion of the DC power to the AC power sets the power factor for the AC power to conform to the determined power factor.

16 Claims, 3 Drawing Sheets

SYSTEM AND METHOD FOR VAR INJECTION AT A DISTRIBUTED POWER GENERATION SOURCE

BACKGROUND OF THE INVENTION

The invention relates to controlling a local energy generation source to influence in a desired way the power factor of energy delivered to the local source by a power utility grid.

Alternating current (AC) electrical power is distributed over a power utility grid to end users, such as homes and businesses. Large power generation plants generate AC power for the grid. Inefficiencies in the transmission of AC power over the grid occur due to an excessive leading or lagging power factor in the AC power being delivered to an end user. Greater efficiencies may be achieved in power distribution if the power factor could be adjusted at the location of an end user.

Conventional techniques to adjust the power factor include passive devices such as capacitors and inductors. The devices to adjust the power factor have been incorporated into equipment at end user sites, located at a central substation in a grip, or otherwise spread out over a distribution system. These conventional techniques provide a constant adjustment to the power factor at the location at or near the end user.

Increasingly, relatively small power generation units distributed through the grid generate real and reactive power for a local power customer and for the grid. These distributed power generation sources may be wind, solar or hydro power generation units; battery storage units; fuel burning units or other sources of electrical power.

Distributed power generation units can contribute to adjusting the power factor at an end user site that both generates local power and receives power via the utility power grid. A distributed power generator influences the power factor at the end user site where the unit is located.

BRIEF DESCRIPTION OF INVENTION

A method has been conceived for adding locally generated reactive power to a power distribution grid comprising: generating or storing direct current (DC) power by distributed power source at a customer location associated with a customer load consuming alternating current (AC) from the power distribution grid; converting the DC power to an alternating current (AC) power at the customer location; calculating or measuring a power factor for the AC power from the distribution grid and being provided to the customer location; determining a power factor for the conversion of DC power to AC power based on an optimum power factor for the AC from the distribution grid, and the conversion of the DC power to the AC power sets the power factor for the AC power to match the determined power factor.

The determination of the power factor and setting of the power factor may each be performed periodically. The calculation of the power factor may be reflected in a stored schedule of power factors, and the determination of the power factor may involve obtaining the power factor from the schedule. The inverter may include IGBT switches and the switches are controlled to set the power factor for the AC power converted by the inverter.

The calculation or measurement of the power factor may involve data indicative of the power factor obtained from a AC power meter at the customer location. The calculation or measurement of the power factor may involve calculating or measuring the power factor for the customer location from a remote location associated with the power distribution grid.

The method may include transmission of data indicative of the power factor of AC power delivered from the power distribution grid to the customer location from the customer location to a central site collecting data regarding various power levels on the grid.

A method has been conceived using locally generated power and power from a power utility to a provide power to a customer load proximate to the locally generated power, the method comprising: wherein the customer load consumes alternating current (AC) from the power utility and distributed to the customer load via a power distribution grid; generating or storing direct current (DC) power by a distributed power source at a customer location associated with the customer load; converting the DC power to an alternating current (AC) power at the customer location and applying the DC power converted from the AC power to power the customer load; calculating or measuring a power factor for the AC power from the distribution grid and being provided to the customer location; determining a power factor for the conversion of DC power to AC power based on the power factor for the AC from the distribution grid, and the conversion of the DC power to the AC power sets the power factor for the AC power to match the determined power factor.

A distributed power generation assembly system has been conceived comprising: a source of direct current (DC) power; an inverter electrically coupled to the source of DC power and to an AC power distribution grid, wherein the inverter converts the DC power to AC power to be applied to the distribution grid; a controller for the inverter, wherein the controller receives data indicative of a desired power factor for the AC power to be converted from the DC power or data indicative of a power factor of the AC power being distributed on the distribution grid, and the controller applies the data to set a power factor for the AC power to be converted and applied to the distribution grid.

The inverter may include IGBT switches and the controller may operate the switches to achieve the setting of the power factor. The controller may set an optimum power factor for the AC power and sets the AC power being converted to the determined power factor. The controller may periodically determine the power factor based on the data which is periodically received. The controller may store a schedule of power factors, and the controller determinates the power factor to be set in the AC power converted from the DC power. The received data may be indicative of a measurement from a meter at a customer location proximate to the distributed power generation assembly. The data may be received from a remote location associated with the power distribution grid.

DETAILED DESCRIPTION OF THE INVENTION

Figure 1:
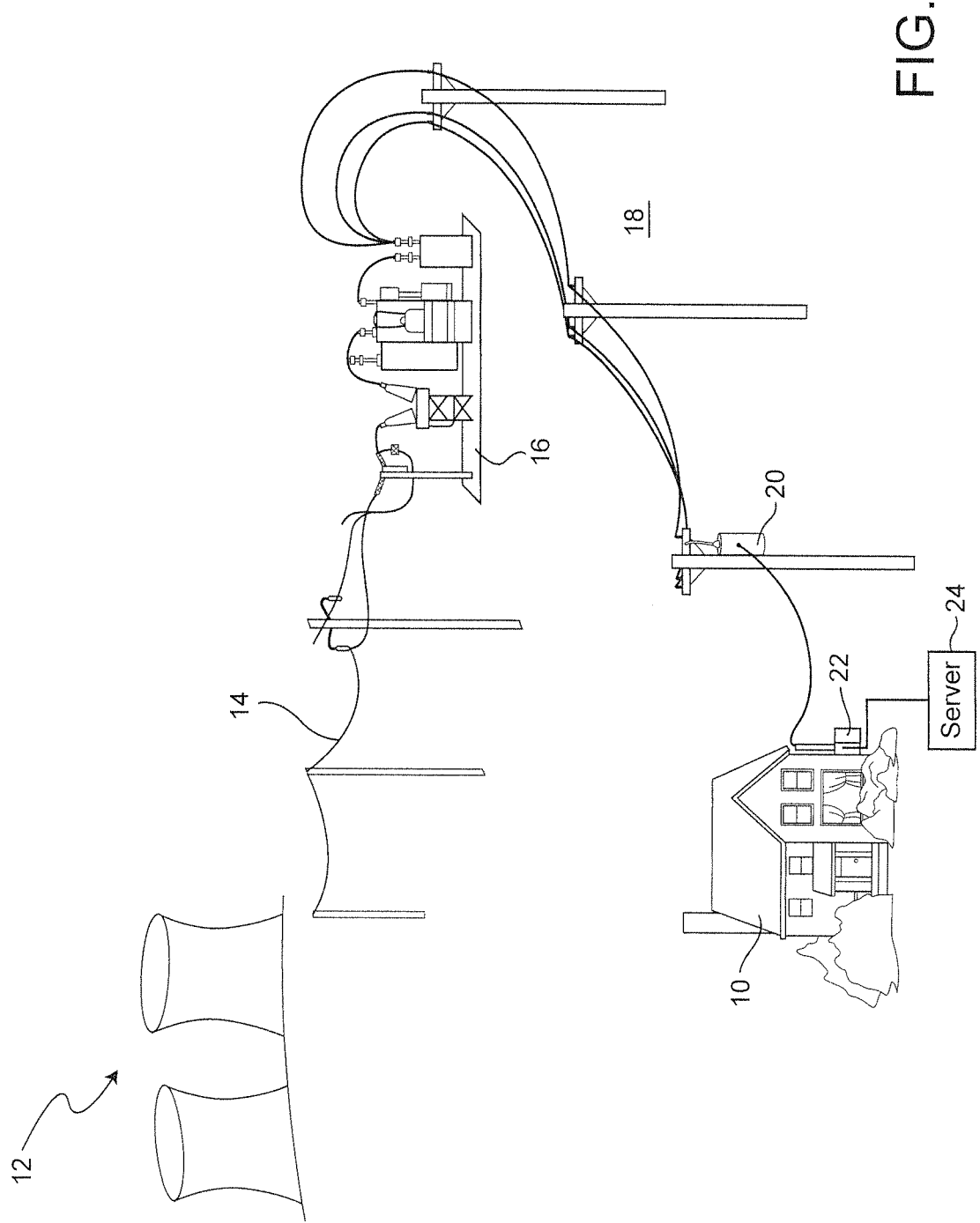
FIG. 1 is a schematic diagram of an electrical power transmission and distribution system for a residential customer having a distributed energy generation subsystem

FIG. 1 illustrates an electrical power transmission system, such as a conventional utility power grid, for distributing electrical power to a residential home customer 10 or other power customer. Electrical power is centrally generated by a utility power generation plant 12, such as a coal, oil or nuclear power plant. The electrical power generated by the plant is high-voltage, alternating-current (AC) having a predetermined frequency, e.g., 60 hertz (Hz) or 50 Hz. The AC energy is transmitted through a utility power grid that includes a transmission system 14 of high-voltage power lines and substations 16 that transform the high-voltage energy to lower-voltage AC energy suitable for primary distribution lines 18. A distribution transformer 20 steps-down the AC energy from the primary distribution lines to a voltage level, e.g., 120 volts (V) or 230V, suitable for the electrical powered devices at the customer site 10. A local power meter 22 at the customer's site measures the power usage by the customer The customer may have a distributed energy source 24, such as a solar, wind, batteries or other type of energy generator. The energy generation source 24 that provides energy locally to the customer site 10 and distribution system 18 and may add reactive and real power to the power grid via the transformer 20, primary distribution system 18, substation 16. The energy generation source 24 is generally referred to a distributed energy source in view of the distribution of such sources at customer sites throughout the power grid.

The power produced by the distributed energy source 24 is converted to AC power by an inverter associated with the distributed energy source. The AC power produced by the inverter is merged with the AC power provided by the distribution grid. The inverter sets the frequency, voltage and phase between voltage and current to conform to the AC power being distributed on the grid and delivered to the customer site corresponding to the distributed energy source.

Figure 2:
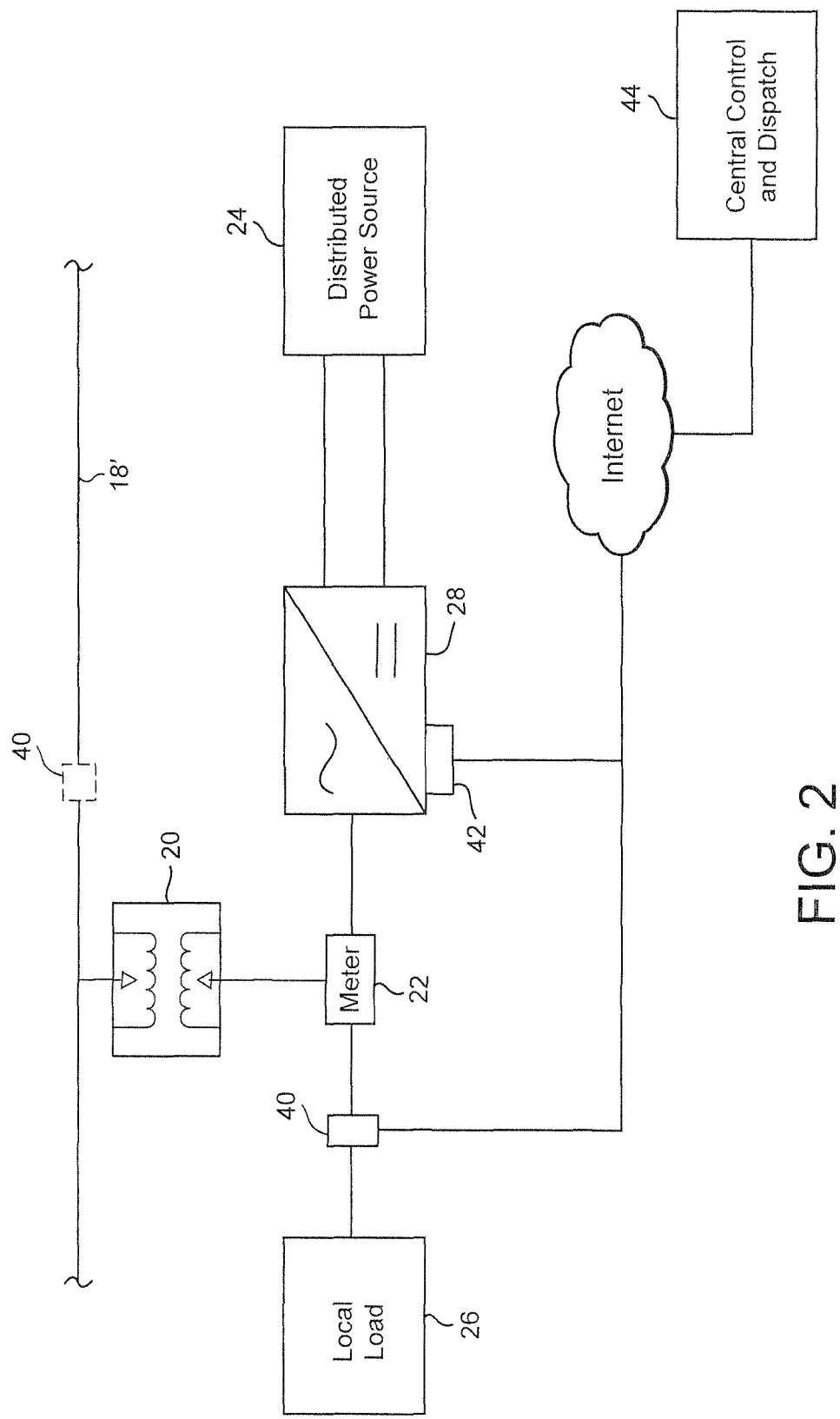
FIG. 2 is a schematic diagram of a local load, transformer connected to a power distribution grid, a local source of DC power and an IGBT inverter.

FIG. 2 is a circuit diagram illustrating the connections between the electrical load 26 created by the customer 10, the distributed power 24 generated by the customer and the distribution system 18. A local inverter 28 converts the direct current (DC) voltage provided by the distributed power source 24 to AC voltage compatible with the AC voltage used by the local load 26 and at the distribution transformer 20.

The local inverter 28 may be a three-phase inverter which matches the three-phase AC power used by the local load 26 and the three-phase AC power supplied by the distribution system 18. The local inverter 28 include insulated gate bipolar transistors (IGBT), and a processor (such as a digital signal processor) executing pulse width modulation (PWM) steps to convert DC voltage to AC voltage. The switching sequence of the IGBTs in the local inverter determines the frequency and phase of the AC voltage output by the local inverter.

The fast switching IGBTs enable the inverter 28 to be controlled to convert DC power to AC power having the frequency and a phase suitable for the distribution system 18. For example, the frequency of the AC power output by the local inverter may match the frequency of the three-phase AC power provided by the primary distribution system 18. In addition, the phase of the voltage of the AC power output by the inverter may be set to match the phase of the voltage of the AC power from the distribution system 18 at the distribution transformer 20 or meter 22. In particular, the inverter 28 may control the phase of the AC power to compensate for a leading or lagging power factor in the AC power delivered by the distribution system at the transformer 20 or meter 22.

Figure 3:
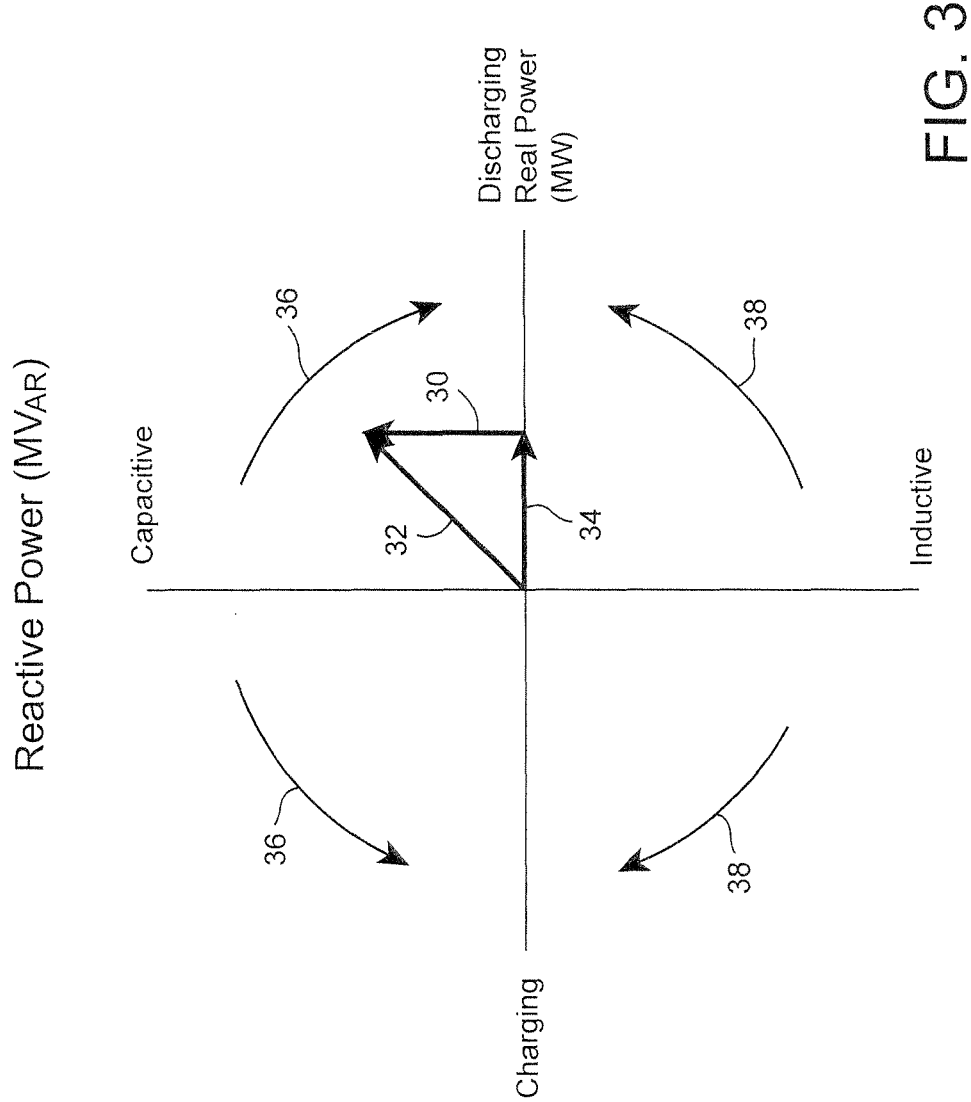
FIG. 3 is a diagram illustrating reactive power as it relates to leading and lagging power factors

FIG. 3 is a diagram illustrating the reactive and real power components of the apparent power 30. A complex power vector 32 is represented in FIG. 3 by a vector formed of a reactive power vector component 30 and a real power vector component 34. The power utilities carry or generate reactive power that is made available to customers over the distribution system 18.

In a simplistic view, real power 34 is the portion of the distributed complex power 32 charged to customers and applied to power electrical loads at a customer site. Similarly, the reactive power 30 is the another portion of the distributed complex power. Reactive power 30 is typically expressed in terms of mega volt-ampere-reactive (MVar) and real power 34 is expressed in terms of mega-watts (MW), where watts is a measure of real power.

The operators of the power generators 12 set the apparent power that they generate to achieve a desired level of reactive and real power applied to the distribution system. The operators select a power factor for the apparent power to set the desired reactive and real power levels. The operators are conventionally limited to setting the power factor only at the generators, and have not been able to adjust the power factor at individual customer locations.

The power factor does not remain constant over the entire transmission and distribution system 14, 16 and 18. The power factor may change due to inductive and capacitive elements in the transmission and distribution system. The reactive power component of the real power is consumed in the transmission and distribution system, such as due to transmission line losses. The consumption of the reactive power component is typically the result of inductive loads in the transmission and distribution system, and customer loads. These inductive loads tend to reduce the reactive power and thus cause the power factor to move 36 towards a "leading" value. In contrast, capacitive elements in the distribution system, which are primarily the power generators 12, tend to increase the reactive power and cause the power factor to move towards a "lagging" value 38.

The power factor set by each of the utility power generators 12 does not necessarily result in the optimal power factor of the power reaching the local load 26 of each customer site. The utility power generators 12 generally lack the ability to adjust the power factor of the power at each customer location or at various locations in the distribution system 14, 16 and 18.

The IGBT inverter 28 at a customer location has the ability to adjust the power factor of the AC power converted from DC power generated locally at the customer site. To achieve a desired power factor, the IGBT inverter may convert the DC power such that there is a desired phase shift between the voltage and current of the AC power. The fast switches in the IGBT inverter 28 may be controlled using conventional methods to produce AC power having a desired power factor. The control of IGBT inverters to produce AC power is well-known and the production of AC power with a desired power factor is well-within the ordinary skill of a designer of control systems for IGBT inverters.

The desired power factor may be determined based on the power factor of the AC current applied to the local load. A measurement device 40 may be used to measure the power factor or reactive power of the AC power applied to the local load. Alternatively, the measurement device 40 may be incorporated in the meter 22 or at various locations of the distribution system 18. The measurement device 40 may calculate the power factor, real power or reactive power level, such as using an electronic device, e.g., a digital signal processor (DSP) that samples the AC power at the measurement device and calculates reactive power or the power factor.

The calculated or measured power factor, reactive power or real power may be compared against a desired power factor, desired reactive power level or desired real power level, such as stored in a controller 42 of the IGBT inverter, the meter 22 or in a central control and dispatch system 44 that communicates with the measurement device 40 such as via wires, wirelessly and the internet. The stored desired level may be a constant level or a calculated level based on conditions at the local load 26.

Based on the comparison of the desired and calculated or measured power level, real power level or reactive power level, the central control and dispatch system 44 may determine the power factor for the AC power converted from the DC power generated locally at the DC power source 24. The determination may be based on data received from the meter 22. The central control and dispatch system 42 implements the dispatched combination of real and reactive power desired for the customer site. The power factor of the AC power produced by the IGBT inverter 28 need not be itself the desired power factor for the AC power applied to the local load.

The AC power from the IGBT inverter is combined with the AC power from the distribution system 18. The combined AC power has a power factor which corresponds to the measured or calculated power factor applied to the local load. The measured or calculated power factor may be determined by the central control and dispatch system. The power factor from the IGBT inverter is selected such that the resulting power factor in the local distribution system 18 matches, as nearly as practical, the desired power factor.

The measuring or calculation of the actual power factor at the local load may be conducted periodically and, similarly, the power factor of the AC power from the IGBT inverter is periodically adjusted. For example, the power factor may be adjusted on a hour-by-hour basis to account for changes in the loads and supply of AC power in the grid. Further, the adjustment of the power factor for the AC power converted by the inverter may be based on a predefined schedule of power factors programmed into the inverter.

Further, the desired power factor may be a desired power factor of the distribution system 18 at a location where the AC power from the distributed DC source 24 is applied to the system 18. The distributed DC source may provide power to the distribution system, as an alternative to or in addition to providing power to the local load. When providing power to the distribution system, the central control and dispatch system 44 of a power generator 12 may set the power factor of the AC from the local distribution system to optimize the power factor of the AC current flowing through the distribution system.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method to add locally generated real or reactive power to a power distribution grid comprising:
    distributing, through the power distribution grid, alternating current (AC) power generated by a power generation plant to local sites connected to the power distribution grid;
    generating or storing direct current (DC) power by a distributed power source at one of the local sites, wherein the distributed power source is connected to the power distribution grid;
    converting the DC power to AC power by executing pulse width modulation (PWM) of an inverter local to the distributed power source, wherein the inverter comprises insulated gate bipolar transistor (IGBT) switches configured to set a power factor, a frequency, and a phase of a voltage for the AC power converted by the inverter;
    sampling the AC power distributed by the power distribution grid at the local site of the distributed power source;
    calculating a power factor, a frequency, and a phase of a voltage for the AC power distributed by the power distribution grid based on sampling the AC power distributed by the power distribution grid at the local site of the distributed power source;
    comparing the power factor, the frequency, and the phase of the voltage for the AC power distributed by the power distribution grid to a desired power factor, a desired frequency, and a desired phase of a voltage for the AC power distributed by the power distribution grid at the local site of the distributed power source, wherein the desired power factor, the desired frequency, and the desired phase of a voltage for the AC power distributed by the power distribution grid are stored in a controller of the inverter;
    determining the power factor, the frequency, and the phase of the voltage for the conversion of DC power to AC power based on the power factor, the frequency, and the phase of the voltage for the AC power distributed by the power distribution grid;
    combining the AC power generated by the conversion with the AC power distributed by the power distribution grid; and
    wherein the conversion of the DC power to the AC power sets the power factor, the frequency, and the phase of the voltage for the AC power generated by the conversion to conform to the determined power factor, the determined frequency, and the determined phase of the voltage of the power distribution grid.

2. The method of claim 1 wherein the calculation or measurement of the power factor, the determination of the power factor and setting of the power factor are each performed periodically.

3. The method of claim 1 wherein the calculation of the power factor is stored as a schedule of power factors, and the determination of the power factor involves obtaining the power factor from the schedule.

4. The method of claim 1 wherein the calculation or measurement of the power factor involves data indicative of the power factor obtained from a meter monitoring the power grid proximate to a location where the DC power is generated or stored.

5. The method of claim 1 wherein the calculation or measurement of the power factor involves calculating or measuring the power factor at a central location associated with the power distribution grid.

6. The method of claim 5 wherein the calculation or measurement of the power factor includes obtaining data indicative of the power factor of AC power delivered from the power distribution grid to the location where the DC power is being generated.

7. A method using locally generated real and reactive power and power from a power utility to provide power to a customer load proximate to the locally generated real and reactive power, the method comprising:
    wherein the customer load consumes alternating current (AC) from the power utility and the customer load is distributed via a power distribution grid, wherein the utility power distribution grid distributes powers to customers of a power utility;
    generating or storing direct current (DC) power by a distributed power source at a customer location associated with the customer load, wherein the distributed power source is connected to the power distribution grid;

converting the DC power to an alternating current (AC) power at the customer location by executing pulse width modulation (PWM) of an inverter local to the distributed power source, wherein the inverter comprises insulated gate bipolar transistor (IGBT) switches configured to set a power factor, a frequency, and a phase of a voltage for the AC power converted by the inverter, and applying the AC power converted from the DC power to power the customer load;

sampling the AC power distributed by the power distribution grid at the customer location associated with the customer load;

calculating a power factor, a frequency, and a phase of a voltage for the AC power from the power distribution grid and being provided to the customer location based on sampling the AC power distributed by the power distribution grid at the customer location associated with the customer load;

comparing the power factor, the frequency, and the phase of the voltage for the AC power distributed by the power distribution grid to a desired power factor, a desired frequency, and a desired phase of a voltage for the AC power distributed by the power distribution grid at the local site of the distributed power source, wherein the desired power factor, the desired frequency, and the desired phase of a voltage for the AC power distributed by the power distribution grid are stored in a controller of the inverter;

determining the power factor, the frequency, and the phase of the voltage for the conversion of DC power to AC power based on the power factor, the frequency, and the phase of the voltage for the AC power distributed by the power distribution grid; and wherein the conversion of the DC power to the AC power sets the power factor, the frequency, and the phase of the voltage for the AC power to match the determined power factor, the determined frequency, and the determined phase of the voltage of the power distribution grid.

8. The method of claim 7 wherein the calculation or measurement of the power factor, the determination of the power factor and setting of the power factor are each performed periodically.

9. The method of claim 7 wherein the calculation of the power factor is stored as a schedule of power factors, and the determination of the power factor involves obtaining the power factor from the schedule.

10. The method of claim 7 wherein the calculation or measurement of the power factor involves using data indicative of the power factor obtained from a AC power meter at the customer location.

11. The method of claim 7 wherein the calculation or measurement of the power factor involves calculating or measuring the power factor for the customer location from a remote location associated with the power distribution grid.

12. A distributed real and reactive power generation assembly comprising:

a source of direct current (DC) power at a location of a customer of a power utility;

an inverter electrically coupled to the source of DC power and to a utility AC power distribution grid distributing AC power to customers of the power utility, wherein the inverter converts the DC power to AC power to be applied to the distribution grid, wherein the inverter comprises insulated gate bipolar transistor (IGBT) switches configured to set a power factor, a frequency, and a phase of a voltage for the AC power converted by the inverter by executing pulse width modulation (PWM);

a controller for the inverter, wherein the controller receives data indicative of a desired power factor for the AC power to be converted from the DC power or data indicative of a power factor of the AC power being distributed on the distribution grid by sampling the AC power distributed by the power distribution grid at the location of the customer, wherein the controller is configured to:

calculate a power factor, a frequency, and a phase of a voltage for the AC power distributed by the utility AC power distribution grid based on sampling the AC power distributed by the utility AC power distribution grid at the location of the customer;

compare the power factor, the frequency, and the phase of the voltage for the AC power distributed by the utility AC power distribution grid to a desired power factor, a desired frequency, and a desired phase of a voltage for the AC power distributed by the utility AC power distribution grid at the location of the customer, wherein the desired power factor, the desired frequency, and the desired phase of a voltage for the AC power distributed by the utility AC power distribution grid are stored in a controller of the inverter; and determine the power factor, the frequency, and the phase of the voltage for the conversion of DC power to AC power based on the power factor, the frequency, and the phase of the voltage for the AC power distributed by the power distribution grid; and wherein the controller applies the data to set a power factor, the frequency, and the phase of the voltage for the AC power to be converted and applied to the distribution grid to conform to the determined power factor, the determined frequency, and the determined phase of the voltage of the utility AC power distribution grid.

13. The distributed real and reactive power generation assembly as in claim 12 wherein the controller periodically sets the power factor based on the data which is periodically received.

14. The distributed real and reactive power generation assembly as in claim 12 wherein the controllers stores a schedule of power factors, and the controller uses the schedule to determine the power factor to be set in the AC power converted from the DC power.

15. The distributed real and reactive power generation assembly as in claim 12 wherein the received data is indicative of a measurement from a meter at a customer location proximate to the distributed power generation assembly.

16. The distributed real and reactive power generation assembly as in claim 12 wherein the received data is received from a remote location associated with the power distribution grid.

* * * * *